United States Patent [19]
Yamaguchi et al.

[11] Patent Number: 5,820,327
[45] Date of Patent: Oct. 13, 1998

[54] APPARATUS FOR HORIZONTALLY TRANSFERRING DISTRIBUTION PALLETS

[75] Inventors: Yoshiro Yamaguchi, Abiko; Jyunjirou Kanazuka, Ushiku, both of Japan

[73] Assignee: Nippon Filing Co., Ltd., Tokyo, Japan

[21] Appl. No.: 966,767

[22] Filed: Nov. 7, 1997

Related U.S. Application Data

[63] Continuation of Ser. No. 586,085, Jan. 16, 1996, abandoned.

[30] Foreign Application Priority Data

Jan. 19, 1995 [JP] Japan .................. 7-023326

[51] Int. Cl.$^6$ .................................................. B65G 1/06
[52] U.S. Cl. ............................................ 414/286; 414/267
[58] Field of Search .................................. 414/267, 273, 414/276, 286; 198/550.5, 772

[56] References Cited

U.S. PATENT DOCUMENTS

| | | | |
|---|---|---|---|
| 3,767,064 | 10/1973 | Lutz | 198/772 |
| 3,837,511 | 9/1974 | Howlett | 414/286 X |
| 3,933,257 | 1/1976 | Weber | 414/267 X |
| 4,200,421 | 4/1980 | Haldimann | 414/267 X |
| 4,282,970 | 8/1981 | Smock | 198/772 |
| 4,470,742 | 9/1984 | Schindler | 414/286 |
| 4,741,657 | 5/1988 | Cassel | 414/267 |
| 4,792,273 | 12/1988 | Specht | 414/286 X |
| 5,605,427 | 2/1997 | Hammond | 414/276 |

FOREIGN PATENT DOCUMENTS

| | | |
|---|---|---|
| 60-50685 | 11/1985 | Japan . |
| 6-20926 | 3/1994 | Japan . |
| 6-115629 | 4/1994 | Japan . |
| 8-198409 | 8/1996 | Japan . |
| 8-198410 | 8/1996 | Japan . |

*Primary Examiner*—David A. Bucci
*Attorney, Agent, or Firm*—Joseph Scafetta, Jr.

[57] ABSTRACT

A horizontal transfer apparatus for transferring distribution pallets includes two horizontally movable rails extending horizontally in a direction of transfer. The horizontally movable rails are adapted to mount thereon those end portions of each distribution pallet which are located perpendicular to the transfer direction, with friction reducers interposed between the rails and the end portions. A vertically movable brake rail is able to be brought into contact with the bottoms of the distribution pallets, and extending between the horizontally movable rails and parallel thereto such that the distance between the vertically movable brake rail and one of the horizontally movable rails is larger than the distance between the vertically movable brake rail and the other of the horizontally movable rails. A single flexible tube, extending completely under and along the vertically movable brake rail, vertically raises and lowers the vertically movable brake rail uniformly as a result of uniform expansion and contraction depending upon a charge and discharge of compressed air therethrough.

7 Claims, 12 Drawing Sheets

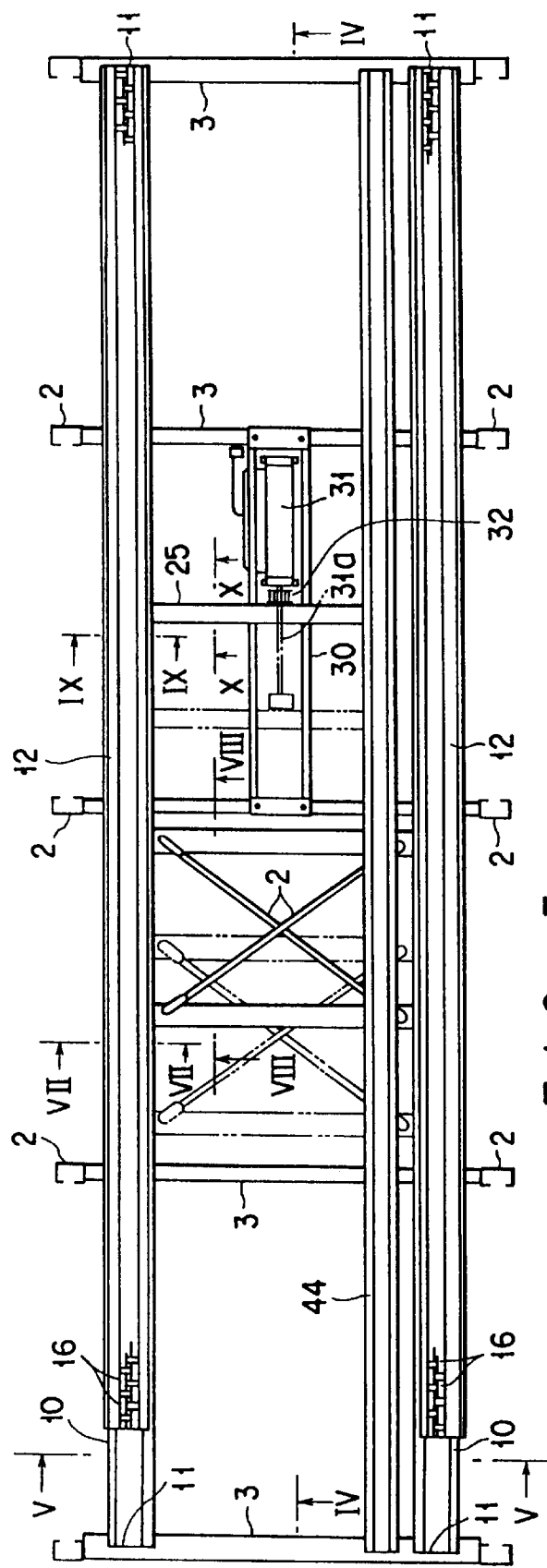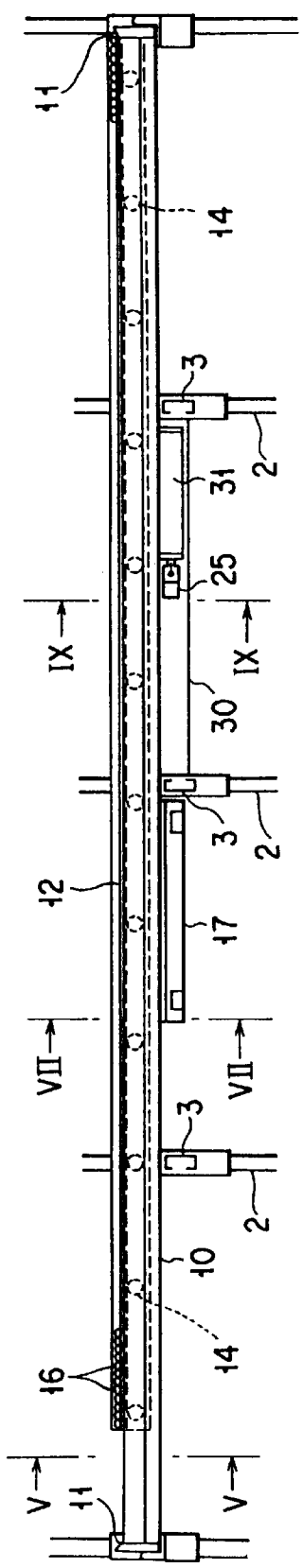
FIG. 3
FIG. 4

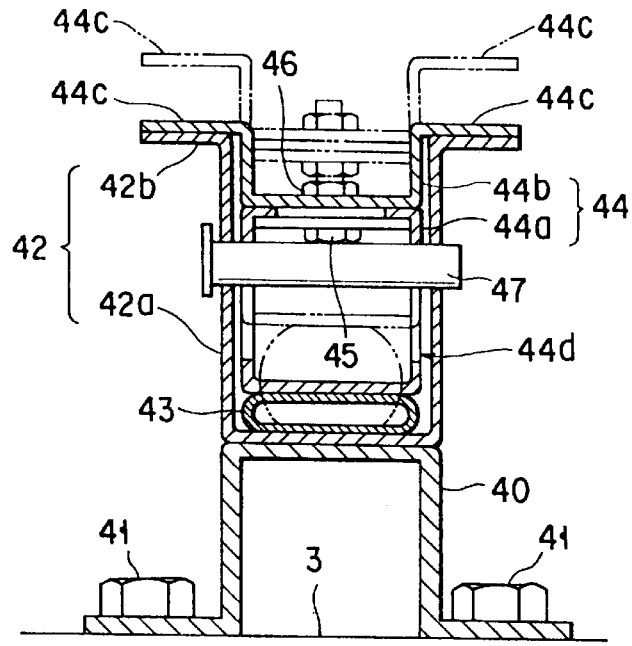
F I G. 6
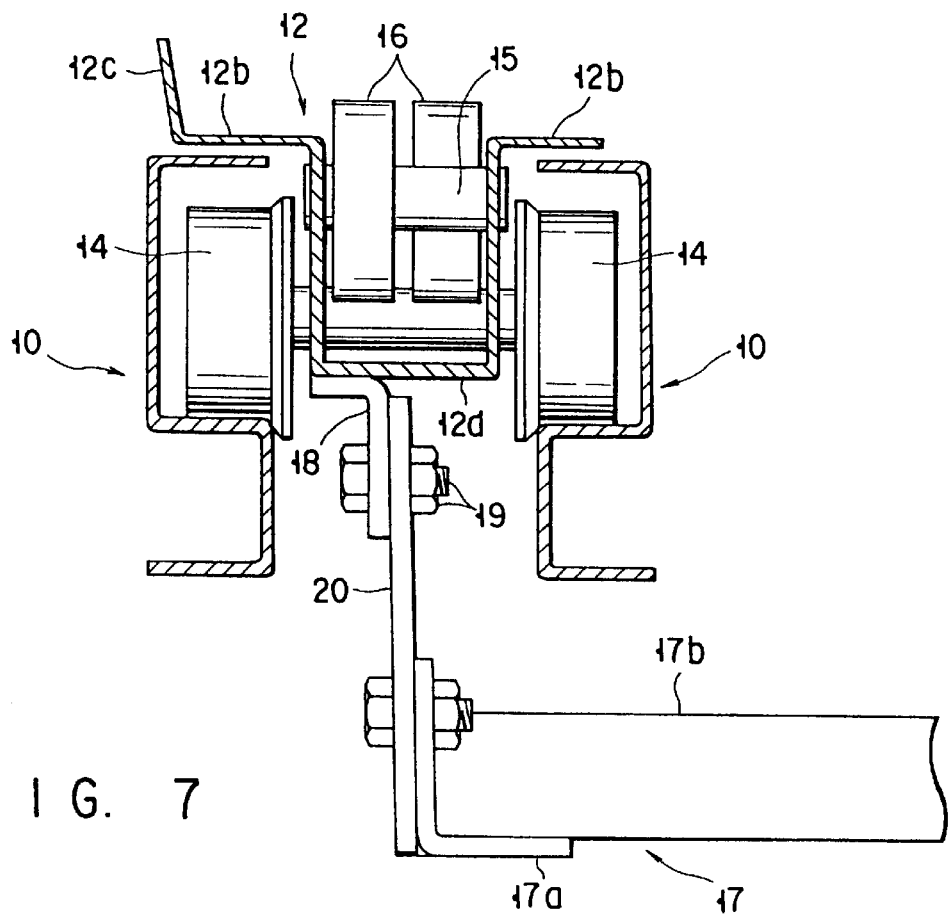
F I G. 7

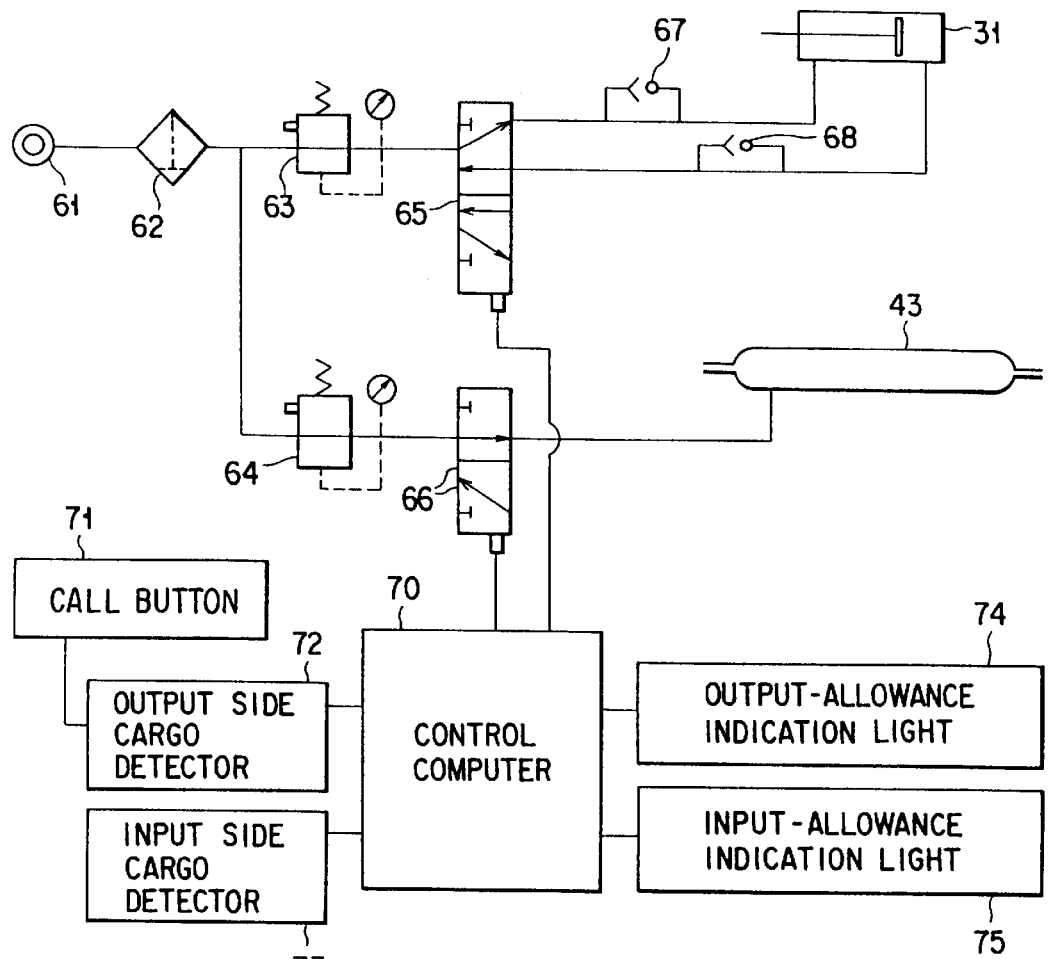
F I G. 13
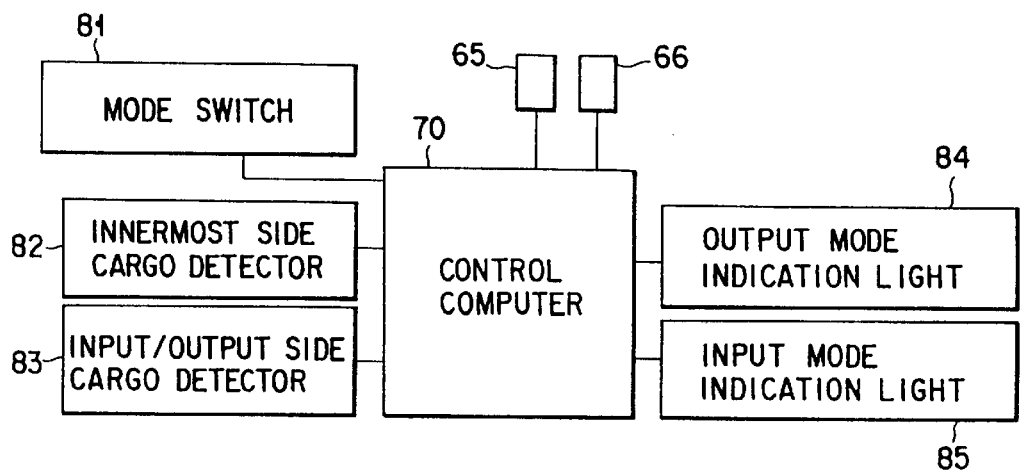
F I G. 14

5,820,327

1

APPARATUS FOR HORIZONTALLY TRANSFERRING DISTRIBUTION PALLETS

This application is a continuation, of application Ser. No. 08/586,085, filed Jan. 16, 1996, now abandoned.

BACKGROUND OF THE INVENTION

1. Field of the Invention

This invention relates to an apparatus for horizontally transferring distribution pallets which mount articles (cargoes) thereon, and more particularly to an improved apparatus for intermittently transferring, along a horizontal rail, distribution pallets arranged thereon.

2. Description of the Related Art

A horizontal transfer apparatus for intermittently transferring articles (cargoes) along a horizontal rail is known, for example, from Japanese Patent Application KOKAI Publication No. 6-115,629 filed by the same applicants as the present application. In this apparatus, cargoes are mounted on horizontally movable members (i.e. transfer members) arranged in a drift shelf in the direction of the transfer of cargoes, and are advanced in the drift shelf. Then, vertically movable members arranged in the direction of transfer are moved up by expanding flexible tubes provided at respective lower portions of the vertically movable members, to raise the cargoes from the horizontally movable members. In this state, the horizontally movable members are moved backward. Thereafter, the vertically movable members are moved down to return the cargoes onto the horizontally movable members. Repeating the above operations enables the cargoes to be advanced intermittently.

In the above-described conventional horizontal transfer apparatus, a plurality of short flexible tubes are arrange, like sleepers, in the drift shelf in the direction of transfer. Thus, the transfer apparatus has many component parts and a complicated structure. In particular, the longer the drift shelf, the larger the number of the vertically movable members and hence the number of flexible tubes. In accordance with the increase in the number of flexible tubes, the number of additional components such as air supply ports and/or air supply pipes must be increased. As a result, the number of the overall component parts increases and the assembling of the component parts is complicated. This is economically disadvantageous.

Further, to move up the vertically movable members until they raise cargoes from the horizontally movable members, highly pressurized air must be supplied into the flexible tubes. Therefore, it is necessary to employ, in the transfer apparatus, either flexible tubes with a resistance against high pressure and/or other expensive component parts for resisting high pressure. This results in further increases in costs.

In addition, unless compressed air is uniformly distributed to the flexible tubes, the vertically movable members may incline. Moreover, each vertically movable member must be formed of a material with high rigidity so as not to be bent and interrupt the transfer of cargoes, even where a cargo is mounted on one side of the vertically movable member in the direction of transfer. Therefore, the weight of the vertically movable member disadvantageously increases.

It should particularly be noted that the above-described horizontal transfer apparatus has been developed to transfer relatively small and light cargoes such as plastic cases, fiberboard boxes, etc., and hence the apparatus does not have a suitable structure for transferring distribution pallets which mount thereon large and heavy cargoes.

2

SUMMARY OF THE INVENTION

The present invention has been developed under the above-described conditions, and aims to provide a horizontal transfer apparatus which has a small number of component parts, accordingly can be assembled easily, does not require expensive materials for resistance against high pressure, and thus can reliably and smoothly transfer distribution pallets at low cost.

According to one aspect of the invention, there is provided a horizontal transfer apparatus for transferring distribution pallets, comprising:

two horizontally movable rails extending horizontally in a direction of transfer and being able to reciprocate in the direction of transfer, said horizontally movable rails being adapted to mount thereon those end portions of each of the distribution pallets which are located perpendicular to the transfer direction, with friction-reducing means interposed between the rails and the end portions, respectively;

means for reciprocating the horizontally movable rails by a predetermined distance in accordance with the charge and discharge of compressed air;

a single vertically movable brake rail being able to be brought into contact with the bottoms of the distribution pallets, and extending between the horizontally movable rails parallel thereto such that the distance between the single vertically movable brake rail and one of the horizontally movable rails is longer than the distance between the single vertically movable brake rail and the other of the horizontally movable rails;

a single flexible tube, extending completely under and along the vertically movable brake rail, for vertically raising and lowering the vertically movable brake rail uniformly as a result of uniform expansion and contraction depending upon the charge and discharge of compressed air;

air charge/discharge means for charging the flexible tube and the reciprocating means with compressed air and discharging the compressed air therefrom; and control means for controlling the compressed air operations of the air charge/discharge means to thereby control the reciprocating motion of the two horizontally movable rails and the vertical motion of the vertically movable brake rail, so as to intermittently transfer the distribution pallets.

BRIEF DESCRIPTION OF THE DRAWINGS

FIG. 3 is a plan view of each lane of the horizontal drift shelf;

FIG. 4 is a sectional side view of each lane of the horizontal drift shelf;

FIG. 6 is a sectional view, showing the structure of a vertically movable brake rail and its peripheral components employed in the horizontal drift shelf;

FIG. 7 is a sectional view, taken along lines VII—VII in FIGS. 3 and 4;

FIG. 13 is a block diagram, useful in explaining an air compressing circuit and a control system employed in the horizontal drift shelf;

FIG. 14 is a block diagram, showing another type of control system employed in the horizontal drift shelf;

DETAILED DESCRIPTION OF THE PREFERRED EMBODIMENTS

Figure 1:
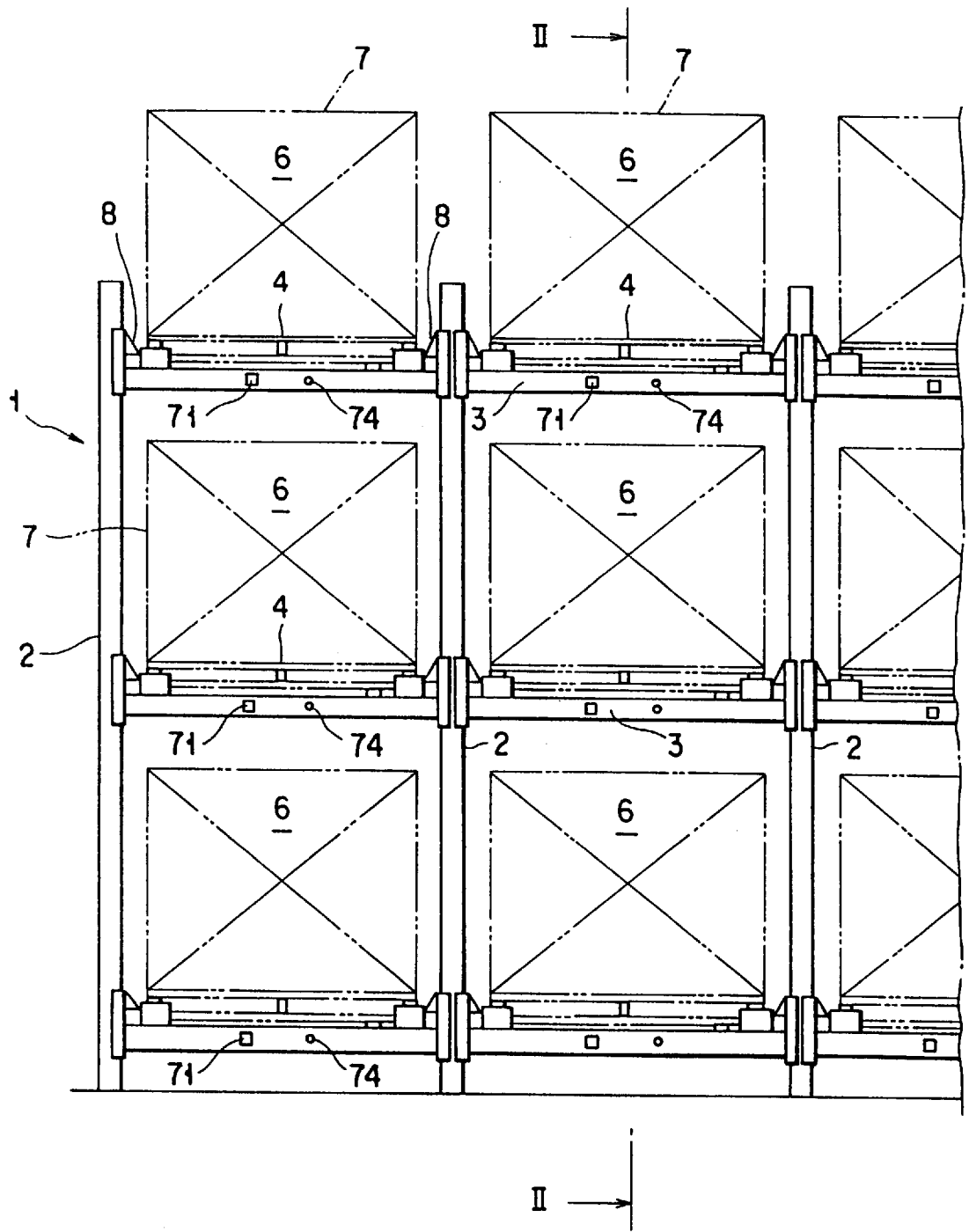
FIG. 1 is a partial front view of a horizontal distribution pallet transfer apparatus according to a first embodiment of the invention, showing one of the frontages of a horizontal drift shelf.
Figure 2:
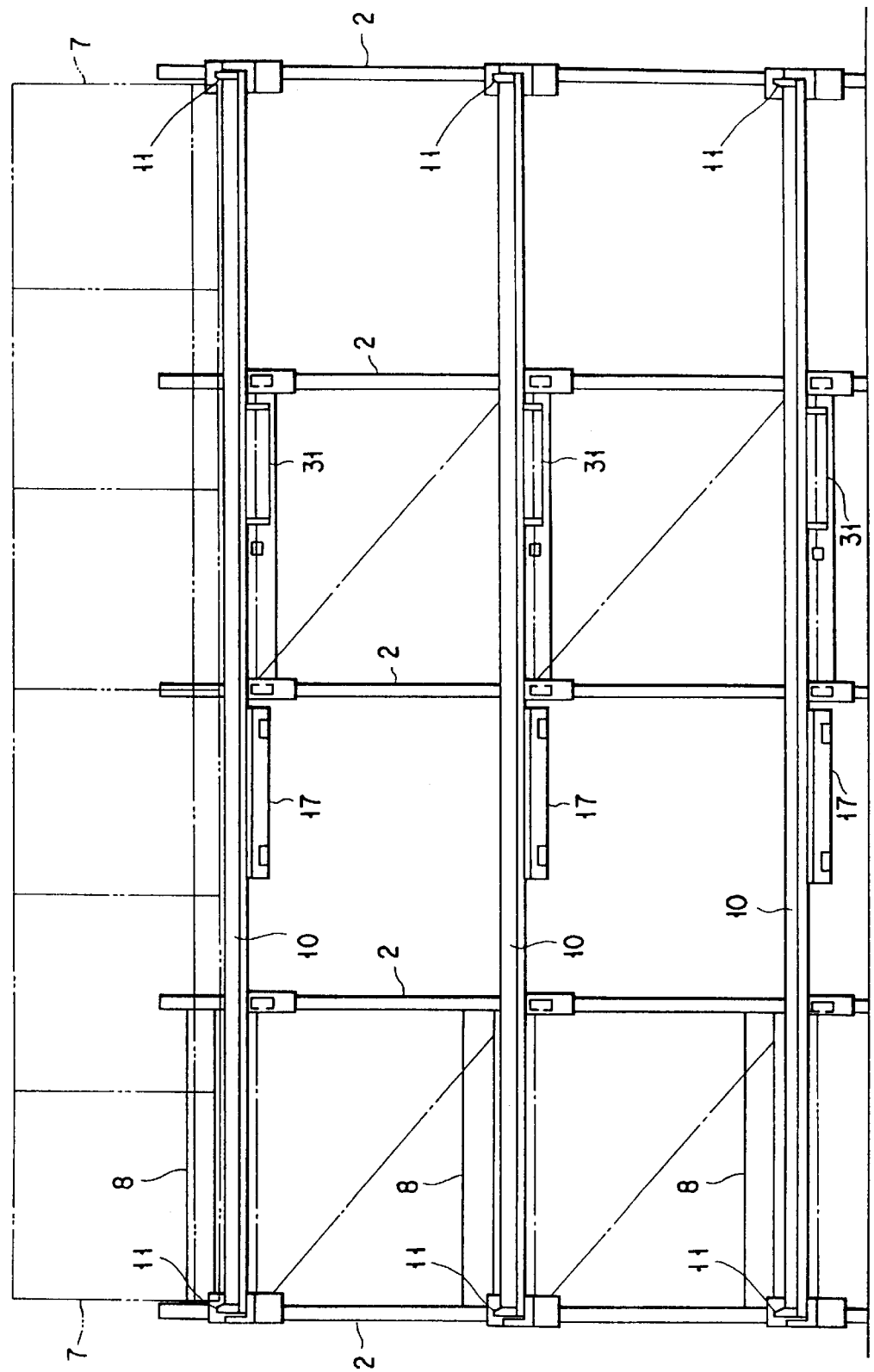
FIG. 2 is a sectional side view of the horizontal drift shelf.

Embodiments of the invention will be explained in detail with reference to the accompanying drawings. FIG. 1 is a front view, showing part of one of the opposite frontages of a horizontal drift shelf 1 according to a first embodiment of the invention. FIG. 2 is a side view of the horizontal drift shelf 1.

In the horizontal drift shelf 1, horizontal column members 3 couple, in a direction perpendicular to the transfer direction, a multiple of vertical support column members 2 which stand in rows and columns. The horizontal column members 3 of FIG. 1 are coupled with stationary support rails 10 of FIG. 2. The rails 10 horizontally extend from the front end of the drift shelf 1 to the rear end of the same.

As is shown in FIG. 1, a plurality of shelf spaces is defined at the frontages in the form of a matrix by the vertical support column members 2 and the horizontal column members 3. These spaces are extended in the transfer direction by the stationary support rails 10. A lane 6 is provided in each shelf space for successively transferring distribution pallets 4 which mount cargoes 7 thereon.

Figure 5:
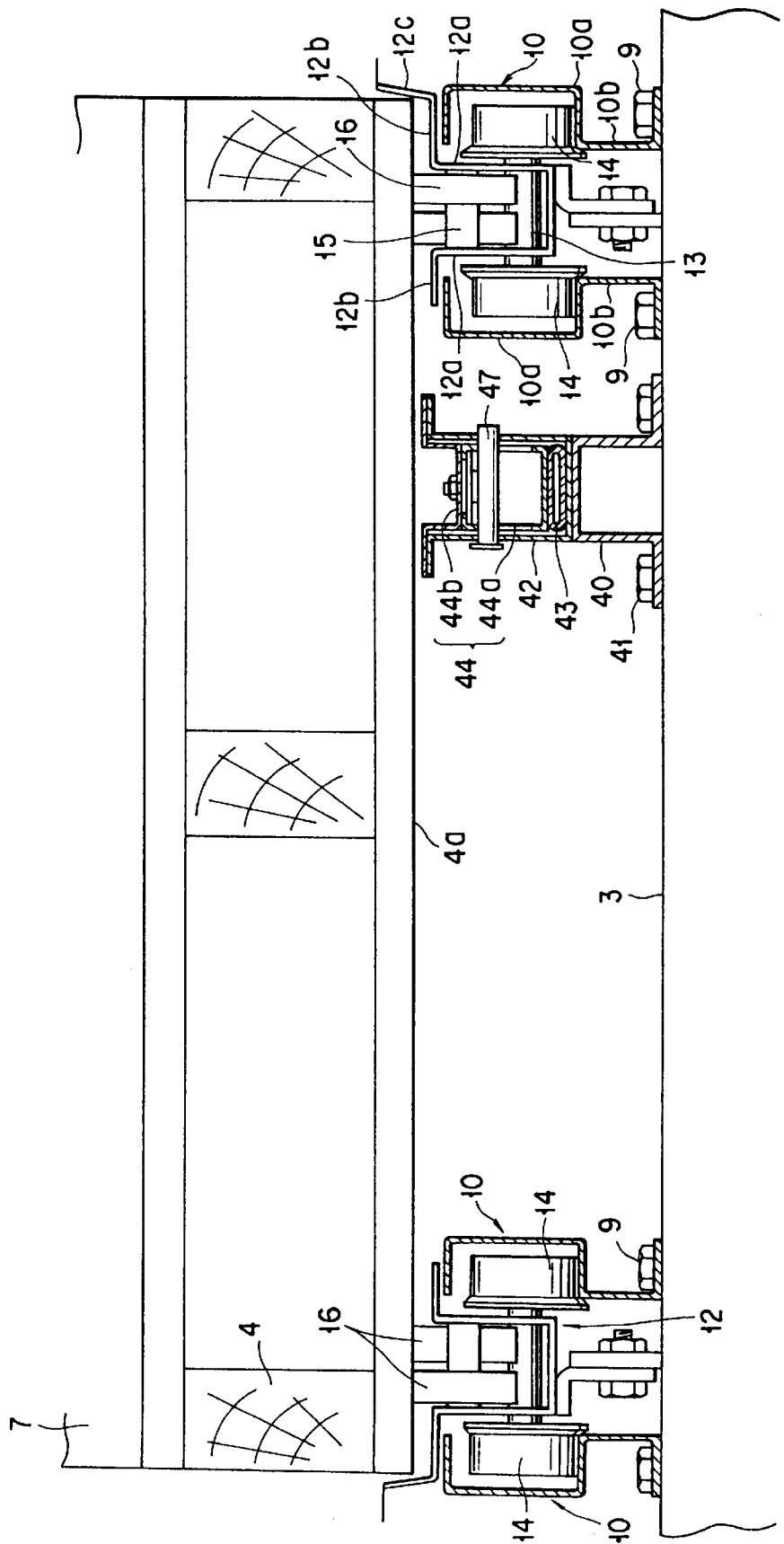
FIG. 5 is a sectional view, taken along lines V—V in FIGS. 3 and 4.

FIG. 3 is a plan view, showing in detail the lane 6 provided in each shelf space. FIG. 4 is a longitudinal sectional view of the lane 6, taken along lines IV—IV of FIG. 3. FIG. 5 is a sectional view, taken along lines V—V of FIG. 4. As is shown in FIG. 1, each lane 6 has two entry guides 8 each having an inner inclined surface and provided between the first and second vertical support column members 2 in the transfer direction. The entry guides 8 are used to position the distribution pallet 4 horizontally.

In each lane 6, two horizontally parallel stationary support rails 10 of FIG. 2 extend along the entire length of the drift shelf, and are secured to the vertical support column members 2 arranged in the transfer direction. More specifically, as is shown in FIG. 5, each of the horizontally parallel stationary support rails 10 has two symmetrical rail elements. These rail elements have their legs 10b secured to the horizontal column members 3 by bolts 9, with their channel-forming openings 10a opposed to each other. Stoppers 11 in FIG. 4 are provided at the front and rear ends of each stationary support rail 10.

A channel-forming rail 12 with an upper opening, which is movable in the transfer direction, extends between the symmetrical rail elements in the transfer direction. The rail 12 will be referred to as a "horizontally movable rail 12". Pairs of running wheels 14 are provided in the transfer direction. Each pair of running wheels 14 is fitted on opposite ends of a wheel shaft 13 in FIG. 5 and are inserted through the opposite side walls 12a of the horizontally movable rail 12. The pair of running wheels 14 is received in the opposed channel-forming openings 10a of the stationary support rail 10, such that they can move therethrough. Accordingly, the rail 12 in FIG. 4 can be moved in the transfer direction.

The opposite side walls 12a in FIG. 5 have their upper ends bent outwardly, thereby forming flanges 12b which horizontally cover upper portions of the stationary support rail 10. The outer one of the flanges 12b has a guide portion 12c which inclines upwardly.

Shafts 15 extend at regular intervals between the opposite side walls 12a in the transfer direction. Rollers 16 are rotatably secured to the shafts 15. They are arranged in a zigzag manner when viewed from above. The distribution pallets 4 are placed on the rollers 16.

As is shown in FIGS. 3 and 4, each horizontally movable rail 12 is shorter than the stationary support rail 10 only by the stroke of an air cylinder 31, which will be explained later. Each pair of the adjacent movable rails 12 which constitute a corresponding lane 6 is coupled with each other by a horizontal rectangular brace frame body 17 in FIG. 4 at a location slightly deviated from the longitudinal center.

Figure 8:
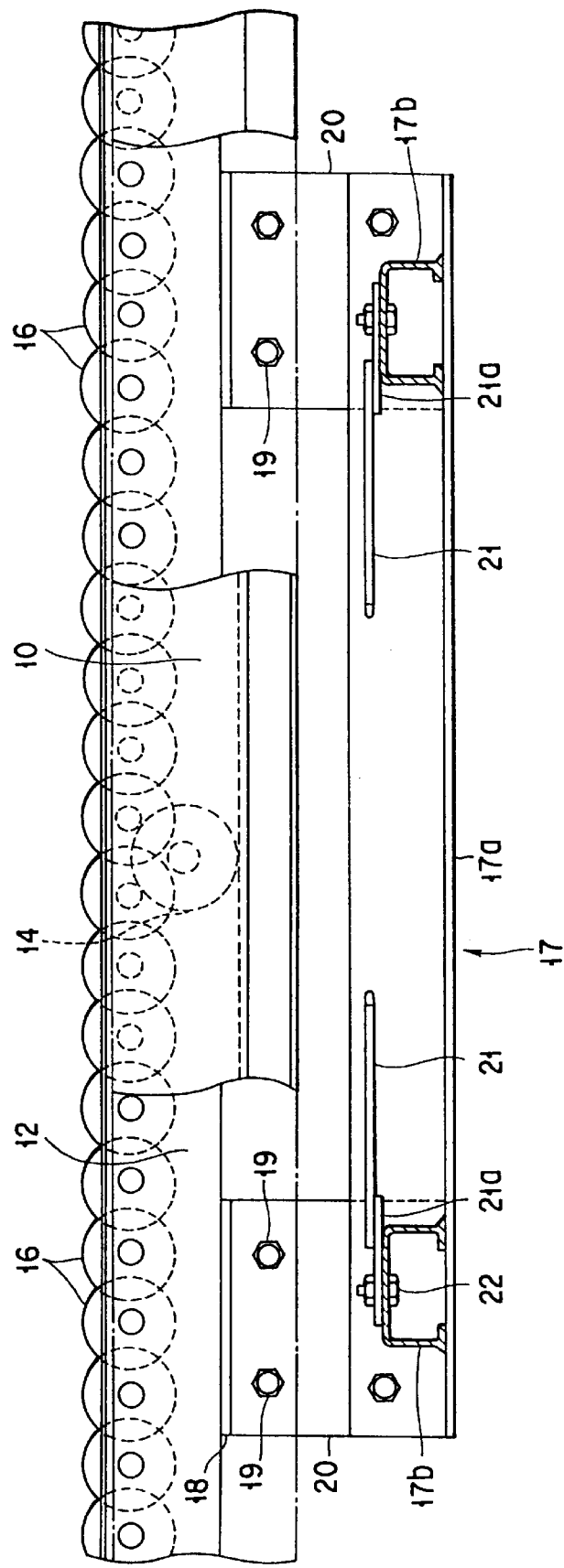
FIG. 8 is a sectional view, taken along lines VIII—VIII in FIG. 3.

As is shown in FIGS. 7 and 8, an attachment plate 18 is secured to the bottom wall 12d of the horizontally movable rail 12. An upper portion of a gusset plate 20 is attached to the attachment plate 18 by a bolt-nut member 19. A lower portion of the gusset plate 20 projects downwardly through the rail elements of the stationary support rail 10.

Two such gusset plates 20 are provided at front and rear portions of each horizontally movable rail 12, and hence each lane 6 has four gusset plates 20. The horizontal brace frame body 17 is secured to a lower portion of each of the gusset plates 20, thereby reliably coupling the attachment plates 18 under each horizontally movable rail 12 with each other.

The horizontal brace frame body 17 comprises a support plate 17a of an L-shaped cross section which couples the lower portions of the front and rear gusset plates 20 with each other, and a pair of channel-forming coupling rods 17b which couple the adjacent support plates 17a with each other. Further, as shown in FIG. 8, two horizontal braces 21 are bridged diagonally between the front and rear coupling rods 17b so as to increase the degree of rigidity. The coupling rod 17b and an end portion 21a of the horizontal brace 21 are secured to each other by a bolt-nut member 22.

Figure 9:
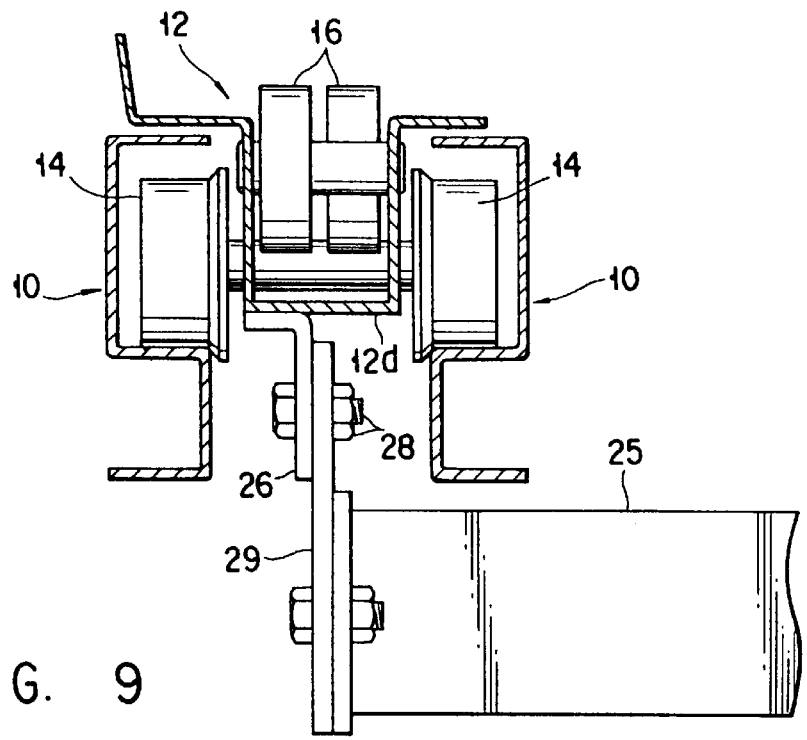
FIG. 9 is a sectional view, taken along lines IX—IX in FIGS. 3 and 4.
Figure 10:
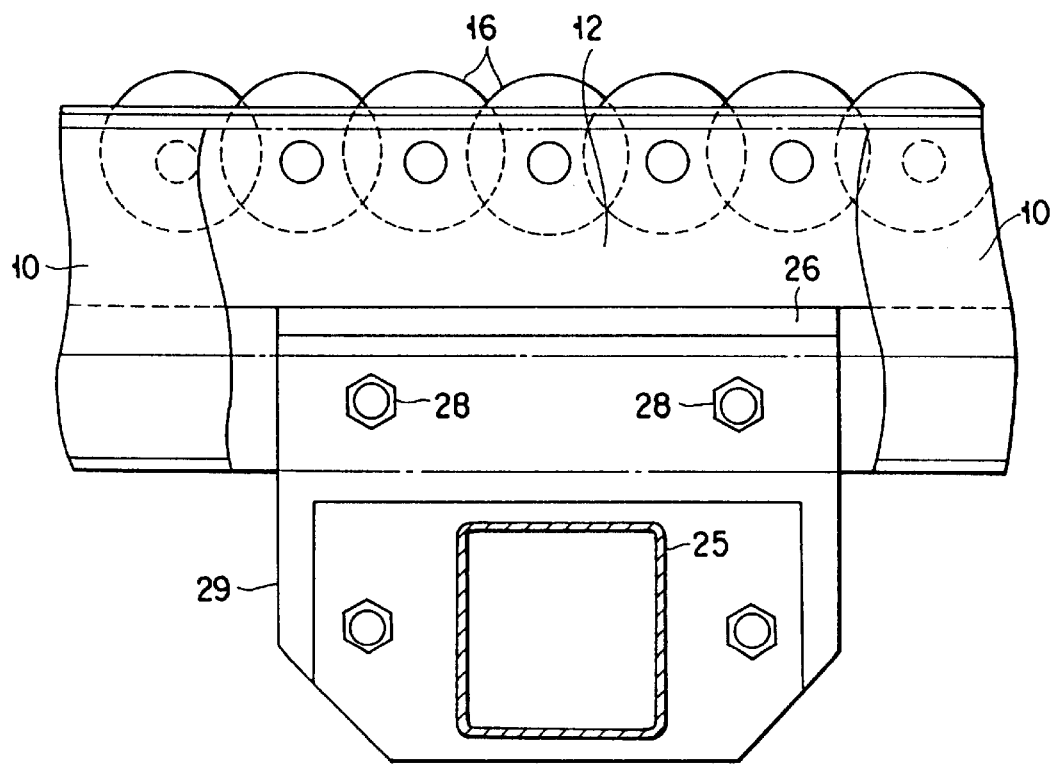
FIG. 10 is a sectional view, taken along lines X—X in FIG. 3.

As is shown in FIGS. 9 and 10, the adjacent horizontally movable rails 12 are coupled with each other by a rectangular reciprocation pipe 25, as well as by the horizontal brace frame body 17 of FIGS. 7 and 8. Specifically, an upper portion of an attachment plate 26 in FIGS. 9 and 10 is secured to the bottom wall 12d of the horizontally movable rail 12. A lower portion of the attachment plate 26 is secured to an upper portion of a gusset plate 29 by a bolt-nut member 28. A lower portion of the gusset plate 26 projects downwardly through the rail elements of the stationary support rail 10. A lower portion of the gusset plate 29 is secured to an end portion of the rectangular reciprocation pipe 25.

Referring again to FIG. 3, a cylinder support member 30 extends in the transfer direction between the front and rear horizontal column members 3, and at a center portion between the adjacent movable rails 12. The air cylinder 31 serving as reciprocating means is received in the cylinder support member 30 and extends parallel to the horizontally movable rails 12.

A piston rod 31a of the reciprocating air cylinder 31 has its tip portion coupled with the rectangular reciprocation pipe 25 via a coupling member 32. When the piston rod 31a has been moved forward and backward by one stroke (which is set to ¼ of the length of the distribution pallet 4 in the transfer direction, or a length slightly longer than ¼ of the length), the rectangular reciprocation pipe 25 and hence the horizontally movable rails 12 connected thereto are reciprocated in the transfer direction.

Referring again to FIG. 5, there is provided a support member 40 between the adjacent movable rails 12 to be reciprocated together, at a location slightly closer to one of the rails 12 than to the other. The support member 40 extends over the entire length of the shelf in the transfer direction, and is fixed to the horizontal column members 3 by bolts 41.

More specifically, as is shown in FIG. 6, a channel-forming stationary support rail 42 is fixed on the support member 40. In the support rail 42, a single flexible tube 43 extends completely therethrough, and a single vertically movable brake rail 44 extends over the flexible tube 43.

The channel-forming stationary support rail 42 has side walls 42a. Flanges 42b are formed by outwardly bending upper portions of the side walls 42a. The single vertically movable brake rail 44 consists of a lower member 44a formed from a rectangular pipe, and a channel-forming upper member 44b. Some portions of the lower members 44a and upper members 44b are fixed by flange-attached bolts 45 and nuts 46.

The members 44a and 44b are loosely received between the side walls 42a. Flanges formed by outwardly bending the side walls of the upper member 44b constitute brake plates 44c, and are placed on the flanges 42b of the stationary support rail 42 when the vertically movable brake rail 44 is in its lowest position.

Pins 47 bridge those portions of the side walls 42a of the stationary support rail 42 which is located in the transfer direction. Each pin 47 extends through a long hole 44d, which is formed in the lower member 44a of the vertically movable brake rail 44 for defining the upper limit of vertical movement of the brake rail 44. The lower limit of vertical movement of the brake rail 44 is defined by the flanges 42b of the stationary support rail 42. In other words, when the rail 44 has lowered and the brake plate 44c has reached the flanges 42b, the lowering motion of the rail 44 stops.

Figure 11:
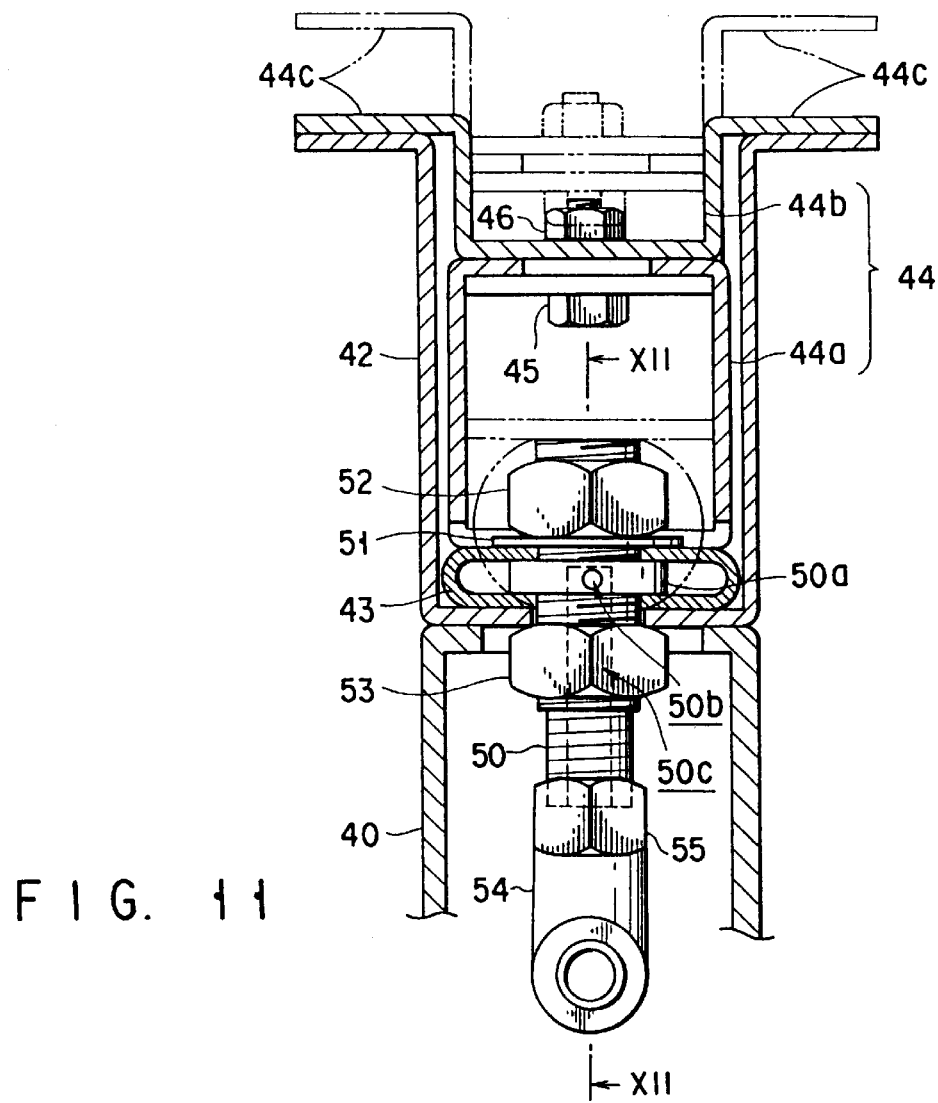
FIG. 11 is a sectional view, showing a compressed air charge/discharge portion of a flexible tube employed in the horizontal drift shelf.
Figure 12:
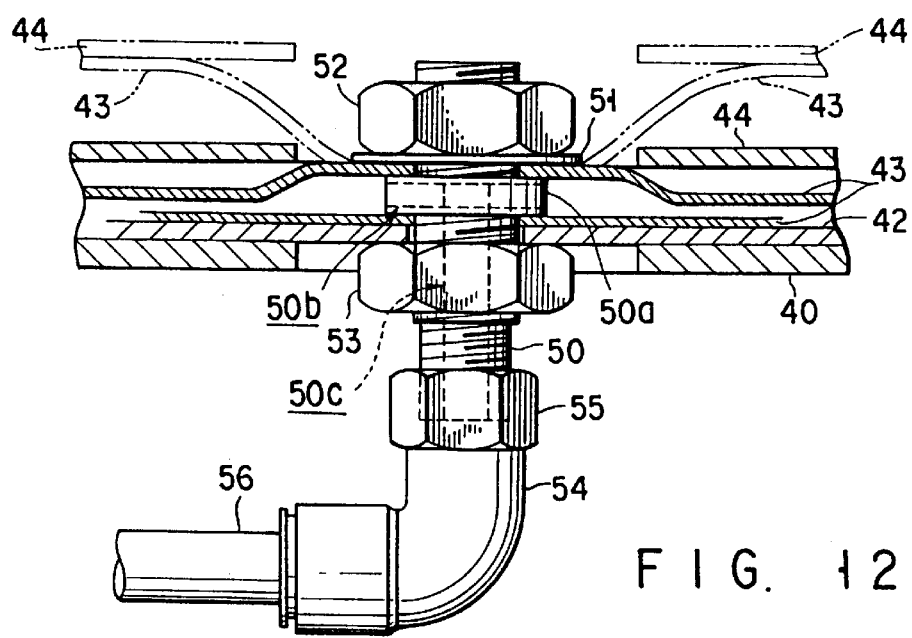
FIG. 12 is a sectional view, taken along lines XII—XII of FIG. 11.

The front and rear ends of the single flexible tube 43 which is elongated in the transfer direction are flattened and closed. Air is supplied between the front and rear ends of the tube 43. FIGS. 11 and 12 show a structure for supplying and discharging compressed air into and out of the flexible tube 43.

An air charge/discharge bolt 50 extends through the flexible tube 43 such that a disk-shaped flange 50a with a predetermined thickness is received in the flexible tube 43. An upper nut 52 is screwed, via a metal seat 51, on that portion of the air charge/discharge bolt 50 which upwardly projects from the flexible tube 43. Further, a lower nut 53 is screwed on that portion of the air charge/discharge bolt 50 which projects downwardly from the bottom wall of the stationary support rail 42.

By fastening the upper nut 52 and the lower nut 53, an upper portion of the flexible tube 43 is tightly held between the flange 50a and the metal seat 51, and a lower portion of the flexible tube 43 is tightly held between the flange 50a and the bottom wall of the stationary support rail 42. In this state, the flexible tube 43 is kept airtight.

That portion of the lower member 44a in FIG. 11 of the brake rail 44 which corresponds to an upper projected portion of the bolt 50 is cut off, while that portion of the upper wall of the support member 40 which corresponds to a lower projected portion of the bolt 50 is likewise cut off.

An air passage 50b is formed through the flange 50a in a diametrical direction. An air passage 50c is formed in a center portion of the bolt 50 and communicates with a center portion of the air passage 50b. An elbow pipe 54 is coupled with a lower portion of the bolt 50 by a nut 55, and also with an air hose 56 in FIG. 12.

In the above-described structure, compressed air supplied through the air hose 56 passes into the air passages 50c and 50b in the air charge/discharge bolt 50 and enters the flexible tube 43 to expand the same. In accordance with the uniform expansion of the single flexible tube 43, the single vertically movable brake rail 44 is raised. On the other hand, discharging the compressed air from the tube 43 lowers the brake rail 44.

The vertically movable brake rail 44 is raised to bring the brake plates 44c in FIG. 11 into contact with the lower surface 4a of the distribution pallet 4, thereby braking the pallet 4 uniformly by the friction force which occurs therebetween. Thus, the pallet 4 with the cargo 7 in FIG. 1 is not raised, and it is not necessary to charge the flexible tube 43 with highly pressurized air.

Therefore, in FIG. 12, it is not necessary to manufacture the flexible tube 43, the air charge/discharge bolt 50, the elbow pipe 54 and the air hose 56 from materials with extremely high-pressure resistance, with the result that the required cost can be reduced advantageously.

FIG. 13 shows an air pressure circuit and a control system employed in the embodiment. As is shown, an air pressure source 61 is connected to input ports of electromagnetic valves 65 and 66 via a filter 62 and pressure reduction valves 63 and 64, respectively.

The electromagnetic valve 65 for moving the rails 12 of FIGS. 3 and 4 in the transfer direction, i.e. in the horizontal direction, which valve 65 is connected in FIG. 13 to the pressure reduction valve 63, is a five-port/two-position valve. One of the two output ports of the valve 65 is connected to the pull-side input/output port of the reciprocating air cylinder 31 via a flow-adjusting one-way valve 67, and the other of the two output ports is connected to the push-side input/output port of the air cylinder 31 via a flow-adjusting one-way valve 68.

With this structure, the air cylinder 31 operates to pull the piston rod 31a of FIG. 3 when the electromagnetic valve 65 of FIG. 13 is in the off-state, and to push the piston rod 31a when the electromagnetic valve 65 is in the on-state. Thus, turning on and off the electromagnetic valve 65 at regular intervals drives the piston rod 31a in the air cylinder 31 forward and backward, thereby reciprocating the horizontally movable rails 12 of FIGS. 3 and 4.

On the other hand, the electromagnetic valve 66 of FIG. 13 for vertically moving the rails 44 of FIGS. 11 and 12, connected to the pressure reduction valve 64 of FIG. 13, is a three-port/two-position valve. The output port of the valve 66 is connected to the flexible tube 43 via the air hose 56 of FIG. 12.

With this structure, when the valve 66 of FIG. 13 is in the off-state, the flexible tube 43 communicates with the atmosphere and hence the interior of the tube 43 is under atmospheric pressure. The vertically movable brake rail 44 of FIG. 11 is therefore situated in its lowest position. On the other hand, when the valve 66 of FIG. 13 is in the on-state, pressurized air is supplied into the flexible tube 43. As is indicated by the two-dot chain line in FIG. 12, the flexible tube 43 is expanded and the brake rail 44 is raised.

The electromagnetic valve 65 of FIG. 13 for horizontal movement and the electromagnetic valve 66 for vertical movement are controlled by a control computer 70. The computer 70 receives a call signal from a call button 71 and detection signals from an output-side cargo detector 72 and an input-side cargo detector 73, thereby controlling the electromagnetic valves 65 and 66, the turning-on and -off of an output-allowance indication light 74 which indicates that a cargo can be output, and the turning-on and -off of an input-allowance indication light 75 which indicates that a cargo can be input.

In this embodiment, the horizontal drift shelf 1 of FIG. 1 is used as a "first-input/first-output" type shelf. In other words, one of the frontages is used as a cargo-input side and the other frontage is used as a cargo-output side. In the cargo-input side frontage, the input-allowance indication light 75 of FIG. 12 is provided at the horizontal column member 3 (not shown) in each lane 6 (also not shown). In the cargo-output side frontage, the call button 71 and the output-allowance indication light 74 are provided at the horizontal column member 3 in each lane 6 as shown in FIG. 1.

The output-side cargo detector 72 of FIG. 13 detects whether or not there is a cargo 7 in FIG. 1 at the output-side frontage in each lane 6, while the input-side cargo detector 73 of FIG. 13 detects whether or not there is a cargo 7 in FIG. 1 at the input-side frontage in each lane 6. The detectors 72 and 73 of FIG. 13 may be formed, for example, from an optical sensor, a limit switch, and the like.

The procedure of control at the time of inputting a cargo will now be explained. Suppose that, in the initial stage, the vertically movable brake rail 44 of FIG. 11 is in its lowest position, the horizontally movable rails 12 of FIG. 4 are in a retreat position, i.e. in an input-side position, and the input-allowance indication light 75 of FIG. 13 is in the on-state, indicating that there is no cargo 7 in FIG. 1 in the input-side port. First, the operator confirms that the light 75 of FIG. 13 is lighted, and inputs a distribution pallet 4 in FIG. 1 with a cargo 7 to the input-side port. The input distribution pallet 4 is positioned by the opposed entry guides 8 and is then moved onto the rollers 16 of the opposed horizontally movable rails 12 in FIGS. 3 and 4.

When the input-side cargo detector 73 of FIG. 13 has detected the input of the cargo 7 in FIG. 1, the control computer 70 of FIG. 13 turns off the input-allowance indication light 75 which indicates whether a cargo can be input. Thereafter, the computer 70 switches the state of the electromagnetic valve 65 to drive the reciprocating air cylinder 31 so as to move the horizontally movable rails 12 forward in FIGS. 3 and 4, i.e. towards the cargo output side, by one stroke of the piston rod 31a, together with the distribution pallet 4 mounted thereon.

Subsequently, the computer 70 of FIG. 13 switches the state of the electromagnetic valve 66 for vertical movement to expand the flexible tube 43. As a result, the vertically movable brake rail 44 of FIG. 11 is raised and has its brake plates 44c brought into contact with the lower surface 4a of the distribution pallet 4 in FIG. 5. The pallet 4 is stopped by the friction force of the brake plate 44c in FIG. 6.

While the distribution pallet 4 of FIG. 5 is stopped, the computer 70 of FIG. 13 switches the state of the electromagnetic valve 65 for horizontal movement, to drive the reciprocating air cylinder 31 so as to move the horizontally movable rails 12 backward in FIGS. 3 and 4, i.e. toward the cargo input side, by one stroke of the piston rod 31a.

As a result, the distribution pallet 4 in FIG. 5 stops in the position in which it is braked by the brake rail 44, while the horizontally movable rails 12 are returned to the original retreat position, with the rollers 16 kept rotating on the lower surface 4a of the distribution pallet 4. Thereafter, the computer 70 of FIG. 13 again switches the state of the electromagnetic valve 66 for vertical movement so as to lower the brake rail 44 of FIG. 5 and relieve the pressure on the lower surface 4a of the distribution pallet 4.

As described above, only the distribution pallet 4 mounted on the horizontally movable rails 12 is transferred forwardly in FIGS. 3 and 4, i.e. toward the output side port, from the input side port by one stroke of the piston rod 31a of the air cylinder 31. Thus, the horizontally movable rails 12 and the vertically movable brake rail 44 of FIG. 6 are returned to their initial positions.

Repetition of the above-described control steps enables the distribution pallet 4 of FIG. 5 to be transferred to the output side port in units of one stroke. In other words, the pallet 4 is advanced intermittently until it reaches the output side port. After the above-described series of operations is repeated four or five times, a space for allowing a new pallet 4 to be input therein is available at the input side port. At this time, the input-side cargo detector 73 of FIG. 13 detects no cargo. Accordingly, the light 75 is turned on to indicate that a new cargo can be input.

When the new pallet 4 in FIG. 1 has been input to the input side port, the above-described control steps are repeated. In this state, the new pallet 4 and the previously input pallet 4 are simultaneously advanced intermittently.

In other words, a plurality of distribution pallets 4 mounted on the horizontally movable rails 12 of FIGS. 3 and 4 is simultaneously advanced. When the head pallet 4 on the rails 12 has reached the output side port, it is stopped by the stoppers 11. Therefore, pallets 4 which follow the head pallet 4 successively abut against each other, with the result that all the pallets 4 in FIG. 1 are arranged close to each other.

The manner of outputting a cargo will be explained. The output-side cargo detector 72 of FIG. 13 detects whether the distribution pallet 4 of FIG. 1 with the cargo 7 mounted thereon has reached the cargo output port. When the detector 72 of FIG. 13 has detected the cargo 7 of FIG. 1 at the cargo output port, the computer 70 of FIG. 13 turns on the output-allowance indication light 74 for indicating that cargo output can be performed. Upon confirming the turn-on of the light 74, the operator takes the distribution pallet 4 in FIG. 1 out of the output port.

Then, the output-side cargo detector 72 of FIG. 13 detects no cargo at the cargo port, and hence the computer 70 turns off the output-allowance indication light 74. Thereafter, the computer 70 repeats four or five times the above-described operation to move by one stroke each time the other distribution pallets 4 in FIG. 1 towards the output port.

As a result, the distribution pallets 4 which follow the head pallet 4 taken out of the output port are intermittently advanced. When the head of these remaining pallets 4 has reached the output port, the output-side cargo detector 72 of FIG. 13 detects a cargo 7 on the head pallet 4. Then, the computer 70 turns on the output-allowance indication light 74 to indicate that the distribution pallet 4 in FIG. 1 can be output from the output port.

The cargo output operation is performed as described above. The call button 71 provided at the output port is operated to take out immediately a distribution pallet 4 which is stopped when it reaches the output port. Upon operation of the button 71, the above-described series of operations is repeated until that one of the distribution pallets 4 is located closest of all to the output port on the horizontally movable rails 12 in FIGS. 3 and 4.

The repetition of the operation is stopped when the distribution pallet 4 in FIG. 1 has reached the output port and has been detected by the output-side cargo detector 72 of FIG. 13. At this time, the output-allowance indication light 74 is turned on to indicate that the distribution pallet 4 in FIG. 1 can be output.

As explained above, it suffices if the vertical movable rail 44 in FIG. 5 is raised and brought into contact with the lower surface 4a of the pallet 4 to apply a frictional braking force to the distribution pallet 4. In other words, it is not necessary for the rail 44 to raise the cargo 7 itself together with the pallet 4. Thus, the distribution pallet 4 is always supported by the horizontally movable rails 12 in a reliable manner, and hence can be transferred smoothly. Moreover, the rail 44 can be made of a material of not so high rigidity. This means that the rail 44 can be made lightweight.

In this embodiment, the single vertical movable rail 44 is located closer to one of the horizontally movable rails 12 than to the other. Therefore, even where the lower surface 4a of the distribution pallet 4 is bent downwardly because a heavy cargo 7 is mounted thereon, the brake plates 44c of FIG. 6 on the rail 44 are not brought into contact with the center portion of the pallet 4 in FIG. 5 which reaches a lowest position, but into contact with those portions of the pallet 4 which are positioned close to the one of the horizontally movable rails 12 and do not reach the lowest position. Thus, the brake plates 44c of FIG. 6 on the vertically movable rail 44 can contact the lower surface 4a of the pallet 4 in FIG. 5 with an appropriate pressing force at all times, irrespective of the bending state of the pallet 4, and accordingly can reliably brake the pallet 4.

Furthermore, since the lower surface 4a of the distribution pallet 4 is braked by the horizontal long brake plates 44c of FIG. 6 which extend over the entire length of the drift shelf, a sufficient braking effect can be obtained irrespective of whether the lower surface 4a of the pallet 4 in FIG. 5 is flat, a little uneven, or bored with some holes.

Since each lane 6 in FIG. 1 has a simple structure in which only one vertically movable brake rail 44 of FIG. 6 and only one flexible tube 43 are provided, the drift shelf 1 of FIG. 1 can be formed of a small number of component parts and can be assembled with ease. Since, in addition to the above, it is not necessary to use materials of a high pressure resistance, the drift shelf 1 can be formed at further low cost. Also, the shelf 1 does not use a great amount of space and hence does not require a high running cost.

Although the horizontal drift shelf 1 is used as a "first-input/first-output" type shelf, it can also be used as a "first-input/last-output" type shelf by changing the timing of the vertical movement of the vertically movable brake rail 44 in FIG. 5, thereby allowing movement of the distribution pallet 4 backwardly.

To move the pallet 4 intermittently backward, the pallet 4 is braked by raising the vertically movable brake rail 44 while the horizontally movable rails 12 are moved forwardly, and the braking of the pallet 4 is relieved by lowering the brake rail 44 while the rails 12 are moved backwardly.

Thus, the "first-input/last-output" type shelf can be realized by switching the transfer mode of the distribution pallet 4 from an advance mode to a retreat mode. Although in this case, it is not necessary to change the structures of the horizontal drift shelf 1 itself and the air pressure circuit, the functions of switches, indication lights, etc. employed in the control system must be changed slightly.

FIG. 14 shows a control system employed in the "first-input/last-output" type shelf. In this type, the same frontage functions as both the input port and the output port. Accordingly, an output mode indication light 84 and an input mode indication light 85, which can emit light beams of different colors, are arranged at the same frontage in place of the output-allowance indication light 74 and the input-allowance indication light 75 of FIG. 13. Further, a mode switch 81 in FIG. 14 is provided in place of the call button 71 of FIG. 13.

Although the output-side cargo detector 72 and the input-side cargo detector 73 of FIG. 13 are also used in this embodiment, they are referred to in FIG. 14 as an "innermost-side cargo detector 82" and an "input/output side cargo detector 83", respectively.

If the innermost side cargo detector 82 detects no cargo in the cargo input mode where the input mode indication light 85 is lighted to indicate that the distribution pallets 4 of FIG. 1 can be intermittently advanced, the distribution pallets 4 with the cargoes 7 mounted thereon can be successively input. When a first input distribution pallet 4 has reached an innermost portion of the shelf and the innermost side cargo detector 82 of FIG. 14 has detected the cargo 7 in FIG. 1 on the first input pallet 4, and further when the lane 6 is filled and the input/output side cargo detector 83 of FIG. 14 has detected a last input pallet 4, the computer 70 automatically switches the operation mode from the input mode to the output mode. At this time, the input-mode indication light 85 is turned off and the output-mode indication light 84 is turned on.

In the thus-set output mode where the distribution pallets 4 of FIG. 1 are intermittently moved backwards, the pallets 4 are successively output. When all the pallets 4 have been output, both the detectors 82 and 83 in FIG. 14 detect no cargoes 7. At this time, the computer 70 automatically switches the output mode to the input mode.

In addition to the automatic switching between the input and output modes, the mode can forcibly be changed by manually operating the mode switch 81 even during either an input or an output operation.

As explained above, since in the case of using the horizontal drift shelf 1 in FIG. 1 as the "first-input/ last-output" type, the same frontage of the shelf 1 can function as both the input port and the output port. As a result, it suffices if the working space is provided only on one side, i.e. on the frontage used as the input/output port. This means that the space required for the drift shelf 1 can be reduced.

Although a single vertically movable brake rail 44 in FIG. 5 is generally sufficient in each lane 6, a plurality of vertically movable brake rails 44 may be provided in the width direction of the lane 6 if the lane 6 is significantly wide.

Figure 15:
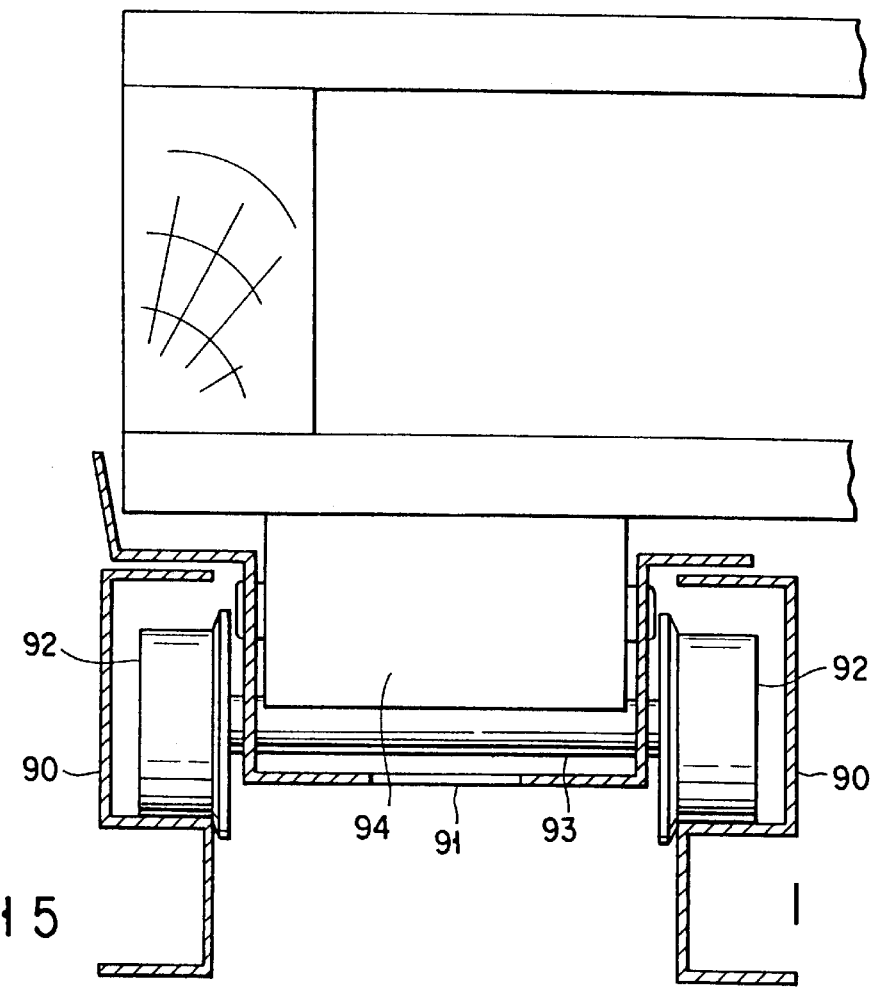
FIG. 15 is a sectional view, showing a horizontally movable rail and peripheral units thereof, employed in the horizontal drift shelf.
Figure 16:
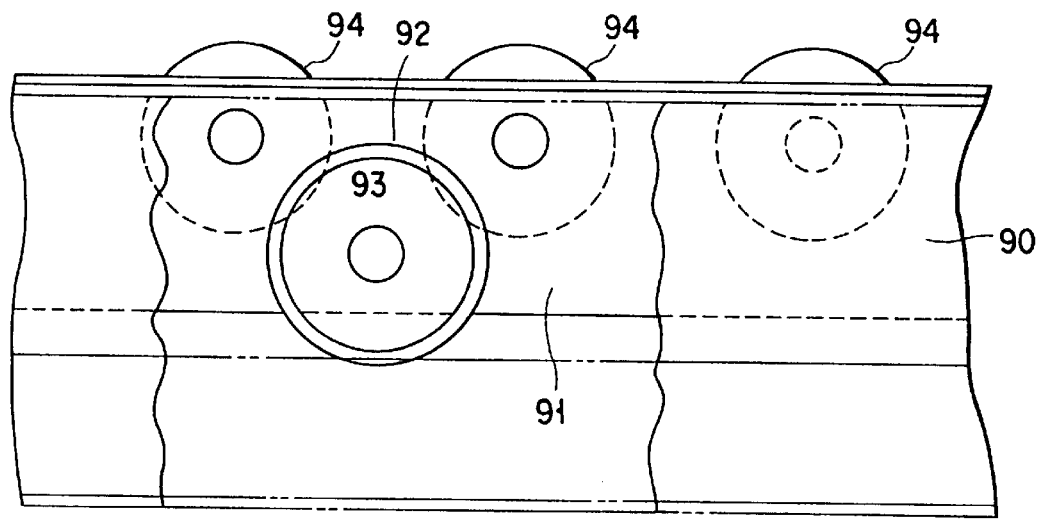
FIG. 16 is a side view of the horizontally movable rail and the peripheral units employed in the horizontal drift shelf.

Although the rollers 16 of a narrow width are arranged in a zigzag manner in each horizontally movable rail 12, the structure may be modified further. As is shown in FIGS. 15 and 16, the distance between right and left stationary support rails 90 and the width of a horizontally movable rail 91 is enlarged, a long wheel shaft 93 is provided between right and left running wheels 92, and wide rollers 94 are rotatably arranged with an appropriate pitch between the side walls of the horizontally movable rail 91. The wide rollers 94 are useful to transfer a pallet 4 having a thin lower surface 4a or a pallet 4 of a low strength.

Figure 17:
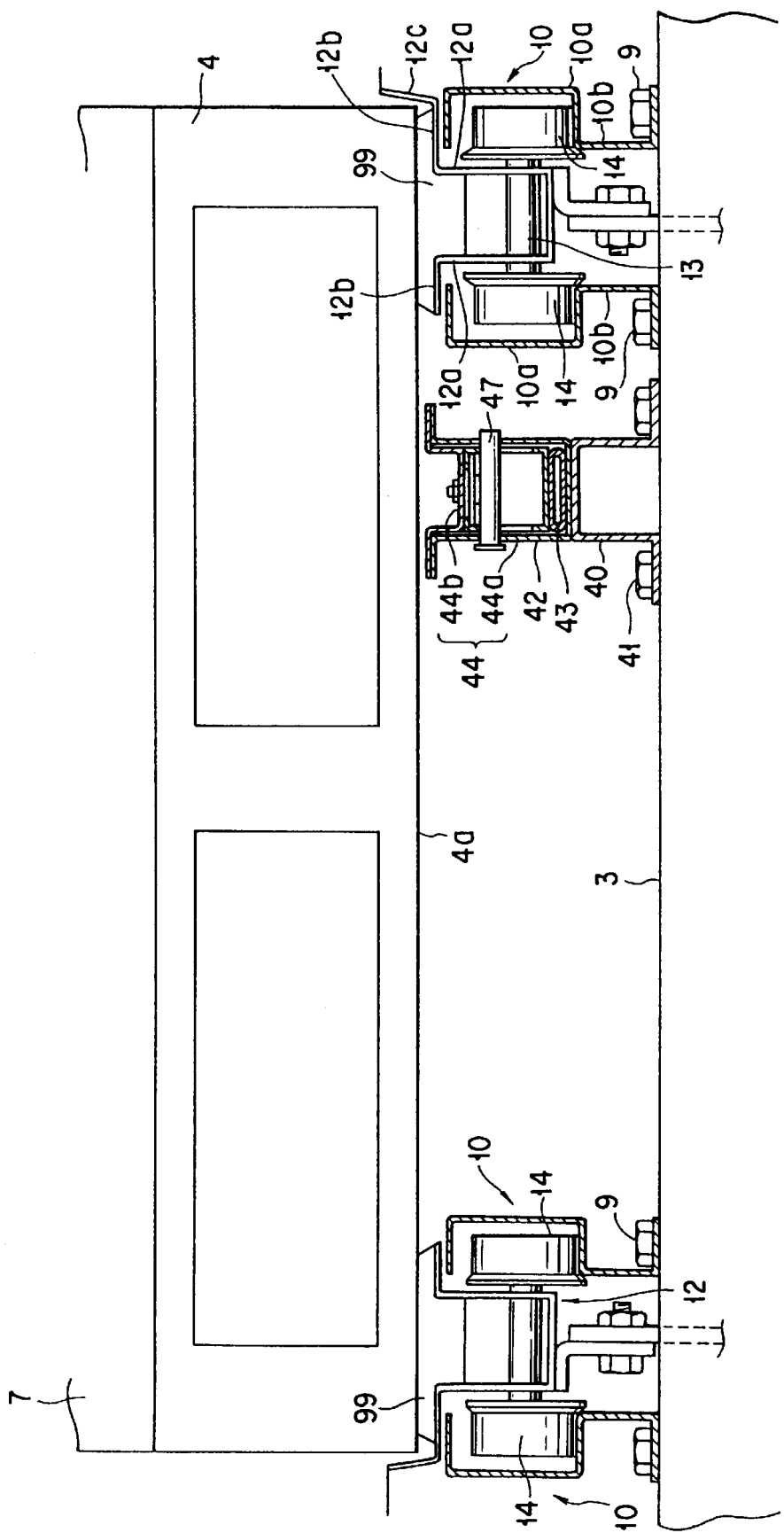
FIG. 17 is a sectional view, showing the horizontally movable rail and other peripheral units, employed in the horizontal drift shelf.

Alternatively, as is shown in FIG. 17, a slippery member 99 with a low friction factor may be located on the flange 12b of the horizontally movable rail 12, in place of the wide rollers 94, such that the distribution pallets 4 slip on the member 99. This structure is more simple than the structure which employs the wide rotatable rollers 94.

The slippery member 99 with a low friction factor is formed, for example, of a high density polyethylene or the like, and is adhered to the flange 12b over the entire length of the rail 12. In this case, it is preferable to form the distribution pallet 4 of a metal or a plastic.

The present invention is not limited to the horizontal drift shelf 1 in FIG. 1, but can be widely applied to various transfer apparatuses consisting of a conveyer, etc.

In FIG. 17, it suffices if the vertically movable rail 44 is brought into contact with the lower surface 4a of the distribution pallet 4 to brake it with a friction force. In other words, the rail 44 does not raise the pallet 4 with a cargo 7 mounted thereon. This means that the flexible tube 43 for moving up and down the vertically movable brake rail 44 can be made of a cheap material which does not have high pressure resistance. As a result, the transfer apparatus of the present invention can be made at a low manufacturing cost and a low running cost.

In addition, since the distribution pallet 4 is not raised, i.e. the vertical displacement of the cargo 7 mounted thereon is only a little, it can be supported in a reliable manner, enabling smooth transfers. It suffices if only a single flexible tube 43 is provided for each vertically movable brake rail 44. This reduces the number of component parts of the transfer apparatus and facilitates the assembly of the apparatus. Further, since it is not necessary to form the vertically movable rail 44 of a rigid material, the rail 44 can be made lightweight.

The vertically movable rail 44 can contact and brake the lower surface 4a of the pallet 4 always in a reliable manner and with an appropriate pressing force, since it is located closer to one of the horizontally movable rails 12 than to the other. More specifically, even where the lower surface 4a of the distribution pallet 4 supported between the horizontally movable rails 12 is bent downwardly, the vertically movable rail 44 contacts that portion of the lower surface 4a of the pallet 4 which is bent to a less degree than the center portion of the pallet 4.

Since the air cylinder 31 in FIGS. 3 and 4 is used to reciprocate the horizontally movable rails 12, a single air supply 61 in FIG. 13 can be commonly used to drive the air cylinder 31 and to charge the flexible tube 43 with compressed air.

The horizontal cargo transfer apparatus or drift shelf 1 in FIG. 1 according to the invention consists of a plurality of long lanes 6, each of which comprises horizontally movable rails 12, the reciprocating air cylinder 31, the single vertically movable brake rail 44, and the single flexible tube 43. Also, it can contain many cargoes 7. By virtue of this structure, the apparatus, which can perform the smooth transfer of cargoes 7, can be formed from a small number of component parts, and hence can be assembled with ease and at low cost.

The drift shelf 1 of the invention can be used as a "first-input/first-output type" shelf by setting it such that the cargoes 7 are input to the transfer lane 6 through one of the frontages of the drift shelf 1 and can be output therefrom through the other of the frontages.

The call button 71 for switching the direction of the transfer of the cargoes 7 is also provided. The switching operation of the call button 71 can selectively set a forward mode to advance the cargoes 7 and a retreat mode to move them backwards. If the forward mode is set at the time of inputting cargoes 7, and the retreat mode is set at the time of outputting them, the drift shelf 1 can be used as a "first-input/last-output" type shelf, wherein the input and output operations of the cargoes 7 can be performed at a single place. Therefore, the shelf 1 can be efficiently operated in a relatively small space.

Figure 18:
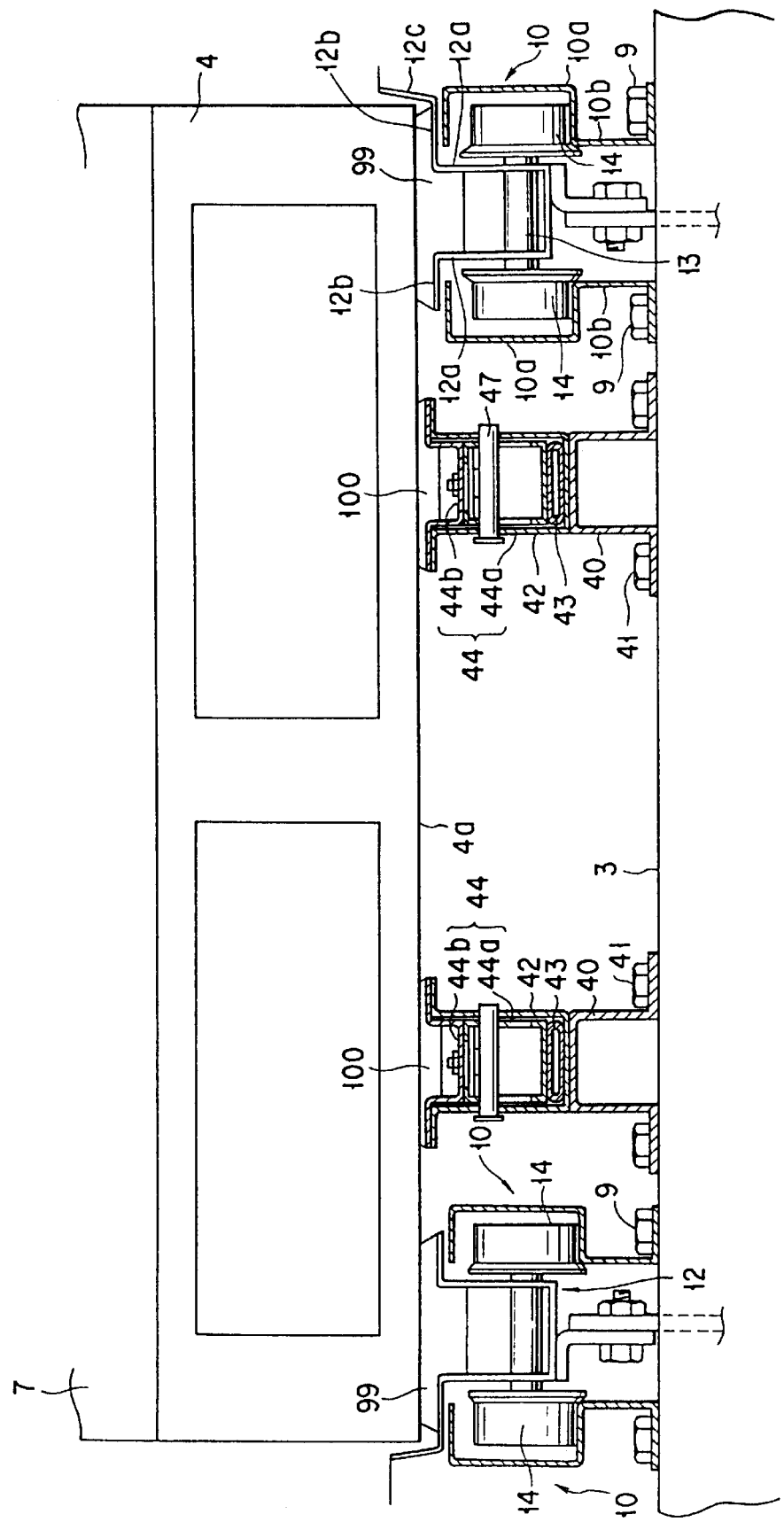
FIG. 18 is a sectional view, showing a horizontal distribution pallet transfer apparatus according to another embodiment of the invention.

Moreover, in FIG. 17 where the slippery member 99 of a low friction factor is mounted on the flange 12b of the horizontally movable rail 12 in place of the wide roller 94, two vertically movable brake rails 44 may be provided between the adjacent horizontally movable rails 12 and parallel thereto as shown in FIG. 18, in order to transfer the distribution pallet 4 more reliably. In this case, the friction member 100 is fixed on the flange portion of the upper member 44b of each vertically movable brake rail 44 such that it can be brought into contact with the lower surface 4a of the distribution pallet 4 to brake it.

The sliding speed of the distribution pallet 4 can be controlled by forming the slippery member 99 of a material with a low friction factor relative to the material of the distribution pallet 4. Further, the braking force applied to the pallet 4 can be adjusted by forming the friction member 100 of a material with a high friction factor as compared with the slippery member 99.

The present invention is not limited to the above-described embodiments, but can be modified in various manners within its scope defined by the appended claims.

We claim:

1. A horizontal transfer apparatus for transferring distribution pallets, comprising:

two horizontally movable rails extending in a direction of transfer and being able to reciprocate in the direction of transfer, said horizontally movable rails being adapted to mount thereon those end portions of each distribution pallet which are located perpendicular to the transfer direction, with friction-reducing means interposed between the rails and the end portions, respectively, wherein the friction-reducing means includes a plurality of rollers located on each of the horizontally movable rails in the direction of transfer;

means for reciprocating the horizontally movable rails by a predetermined distance in accordance with charge and discharge of compressed air;

a single vertically movable brake rail being able to be brought into contact with bottoms of the distribution pallets, and extending between the horizontally movable rails and parallel thereto such that the distance between the vertically movable brake rail and one of the horizontally movable rails is longer than the distance between the vertically movable brake rail and the other of the horizontally movable rails;

a single flexible tube, extending completely under and along the vertically movable brake rail, for vertically raising and lowering the vertically movable brake rail uniformly as a result of uniform expansion and contraction depending upon charge and discharge of compressed air;

air charge/discharge means for charging the flexible tube and the reciprocating means with compressed air and discharging the compressed air therefrom; and control means for controlling the compressed air charge/discharge operations of the air charge/discharge means to thereby control the reciprocating motion of the two horizontally movable rails and the vertical motion of the single vertically movable brake rail, so as to intermittently transfer the distribution pallets.

2. The apparatus according to claim 1, wherein the control means performs a first operation for moving the two horizontally movable rails forward or backward by a predetermined distance, a second operation for raising, after the first operation, the vertically movable brake rail to brake the distribution pallets uniformly on the horizontally movable rails, a third operation for moving, after the second operation, the two horizontally movable rails backward or forward by a predetermined distance, and a fourth operation for lowering, after the third operation, the vertically movable brake rail uniformly to relieve the distribution pallets, said control means repeating the first through fourth operations to intermittently transfer the distribution pallets.

3. The apparatus according to claim 1, wherein the reciprocating means consists of a reciprocating air cylinder.

4. The apparatus according to claim 1, wherein the two horizontally movable rails, the reciprocating means, the vertically movable brake rail, and the single flexible tube together constitute one of a plurality of long cargo transfer lanes being arranged in rows and columns and constituting a drift shelf.

5. The apparatus according to claim 4, wherein the control means controls the reciprocating motion such that the distribution pallets with cargoes mounted thereon are input through one of the frontages of each of the lanes, and output through the other of the frontages.

6. The apparatus according to claim 4, wherein the control means has a switch means for charging the direction of transfer of the distribution pallets, and operates the switch means to selectively set one of a forward mode for moving forward the distribution pallets and a backward mode for moving backward the distribution pallets.

7. A horizontal apparatus for transferring distribution pallets, comprising:

a first stationary support rail unit including a pair of stationary rail members, which horizontally extend parallel to each other in a direction of transfer and have laterally opening channels opposed to each other;

a first horizontally movable rail having an upwardly opening channel, extending in the direction of transfer, and located between the pair of stationary rail members of the first stationary support rail unit;

a plurality of first rollers rotatably supported by opposite end portions of the first horizontally movable rail, the first rollers enabling reciprocation of the first horizontally movable rail in the direction of transfer when they roll through the channels of the stationary rail members of the first stationary support rail unit;

a plurality of second rollers supported by the first horizontally movable rail and each having a portion upwardly projecting from the channel of the first horizontally movable rail, the second rollers being able to support that end portion of a distribution pallet which is located in a direction perpendicular to the direction of transfer;

a second stationary support rail unit located parallel to the first stationary support rail unit and separated therefrom by a space substantially equal to that length of the distribution pallet which is in the direction perpendicular to the direction of transfer, the second stationary support rail unit including a pair of stationary rail members, which horizontally extend parallel to each other in the direction of transfer and have laterally opening channels opposed to each other;

a second horizontally movable rail having an upwardly opening channel, extending in the direction of transfer and located between the pair of stationary rail members of the second stationary support rail unit;

a plurality of third rollers rotatably supported by opposite end portions of the second horizontally movable rail, the third rollers enabling reciprocation of the second horizontally movable rail in the direction of transfer when they roll through the channels of the stationary rail members of the second stationary support rail unit;

a plurality of fourth rollers supported by the second horizontally movable rail and each having a portion upwardly projecting from the channel of the second horizontally movable rail, the second rollers being able to support that end portion of the distribution pallet which is opposite to the first mentioned end portion of the distribution pallet;

coupling means including a first coupling member extending downwardly from a bottom surface of the first horizontally movable rail between the pair of stationary rail members of the first stationary support rail unit, a second coupling member extending downwardly from a bottom surface of the second horizontally movable rail between the pair of stationary rail members of the second stationary support rail unit, and a third coupling member coupling the first coupling member with the second coupling member;

reciprocating means, coupled with the third coupling member of the coupling means, for integrally reciprocating the first and second horizontally movable rails by a predetermined distance in the direction of transfer in accordance with charge and discharge of compressed air;

a single vertically movable brake rail provided between the first and second horizontally movable rails, parallel thereto and closer to one of the first and second horizontally movable rails than to the other, the vertically movable brake rail being able to be brought into contact with a bottom surface of the distribution pallet to raise the pallet;

a single flexible tube extending below and along the vertically movable brake rail, the flexible tube expanding and contracting in accordance with the charge and the discharge of compressed air, respectively, to vertically move the vertically movable brake rail;

air charge/discharge means for charging the flexible tube and the reciprocating means with compressed air and discharging the compressed air therefrom; and control means for controlling the air charge/discharge means to charge and discharge compressed air and appropriately combine the reciprocation of the first and second horizontally movable rails with the vertical movement of the vertically movable brake rail, to thereby intermittently transfer the distribution pallet.

* * * * *

UNITED STATES PATENT AND TRADEMARK OFFICE
CERTIFICATE OF CORRECTION

PATENT NO. : 5,820,327
DATED : October 13, 1998
INVENTOR(S) : Yoshiro Yamaguchi et al.

It is certified that error appears in the above-indentified patent and that said Letters Patent is hereby corrected as shown below:

Col. 1, line 34, "arrange" should be --arranged--.

Col. 3, line 63, delete the comma.

Col. 5, line 43, delete the comma.

Col. 13, claim 6, line 37, "charging" should be --changing--.

Signed and Sealed this

Ninth Day of March, 1999

Attest:

Attesting Officer

Q. TODD DICKINSON

Acting Commissioner of Patents and Trademarks